March 1, 1938. A. Z. MAMPLE 2,110,003
DEVICE FOR SEALING HOLES IN CABLE SHEATHS
Filed Feb. 15, 1936 2 Sheets-Sheet 1
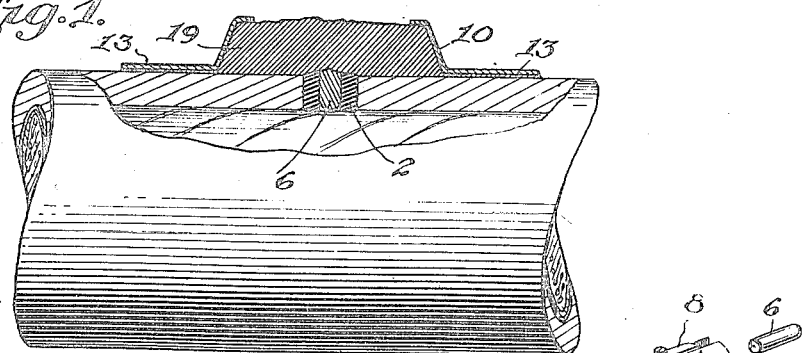
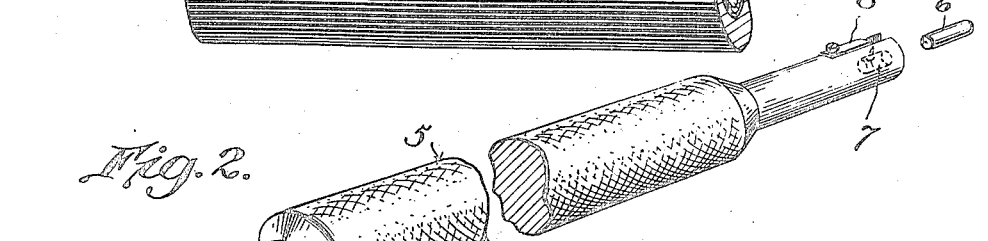
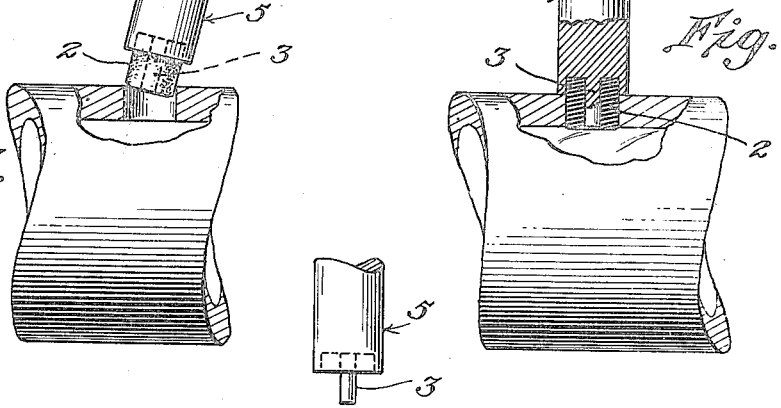
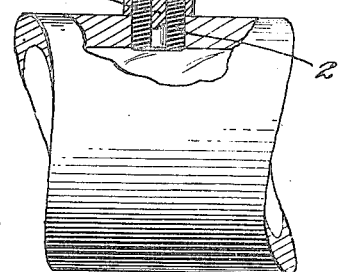
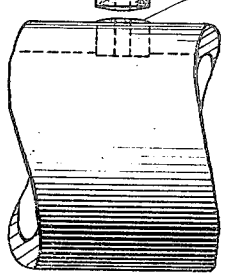
Inventor
A. Z. Mample
Eugene C. Brown
Attorney

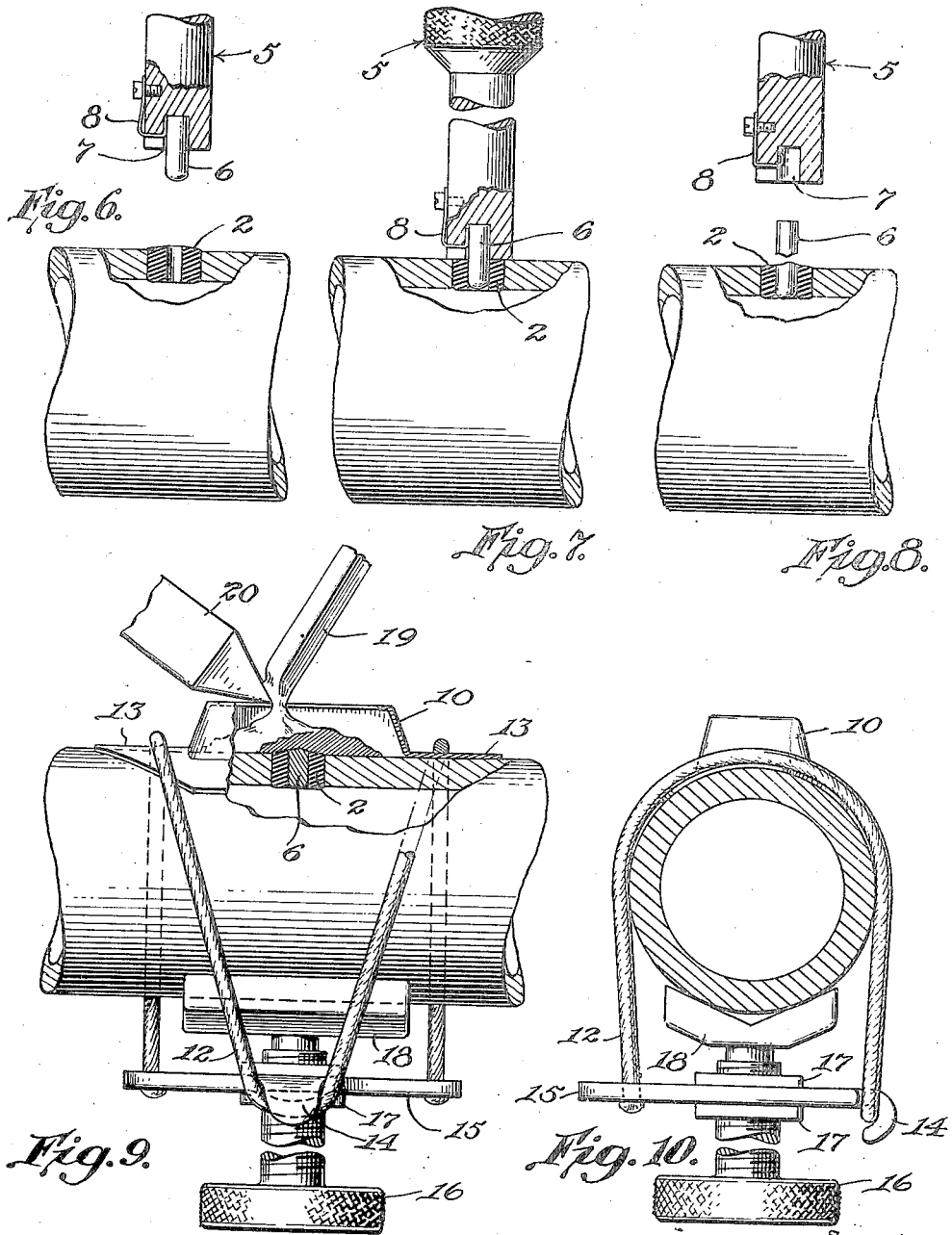

Patented Mar. 1, 1938

2,110,003

UNITED STATES PATENT OFFICE 2,110,003

DEVICE FOR SEALING HOLES IN CABLE SHEATHS

Adolph Z. Mample, Glen Rock, N. J., assignor to The Western Union Telegraph Company, New York, N. Y., a corporation of New York Application February 15, 1936, Serial No. 64,134

4 Claims. (Cl. 138—97)

This invention relates to the sealing of holes in the lead sheaths of communication cables upon the removal of the valves employed in testing the integrity of the sheaths under gas pressure.

Communication cables employed in telegraph and telephone systems are predominately of the paper-insulated lead-sheathed type. Since the paper used in such cables is not impregnated in any manner, its insulating quality is entirely dependent on the exclusion of moisture from the core and hence upon the maintaining of the lead sheath air-tight.

Inasmuch as lead sheathing is extremely susceptible to mechanical injury, it is necessary to constantly maintain a watch over the cables with a view to the detection of faults or defects before they have progressed to the point where the operation of the plant is jeopardized. In order to locate a defect, a section of the cable is divided into gas-tight sections by means of wax dams at the ends of the cable and at intermediate points. A gas, usually oil-pumped nitrogen is then injected into the cable in any section to be tested, filling the interstices between the conductors until a pressure of from 10 to 20 lbs. per square inch is built up within the sheath. The presence of defects in lengths of cable between dams is determined by measuring pressures along the cable and plotting graphically the pressure gradient with respect to the length of the cable. Low points in the curve indicate the location of the leaks or defects.

As a general rule the preliminary pressure curve is inadequate to indicate the exact location of any but the largest type of leaks. To locate leaks not definitely revealed by the pressure curve, it is necessary to obtain pressure readings at more closely adjacent points within the section under observation. To obtain these readings without disturbing the existing pressure gradient and without loss of gas, temporary valves of the type shown in my prior Patent No. 1,999,771 or in my copending application, Serial No. 61,855, filed February 1, 1936, now Patent No. 2,071,698 of February 23, 1937, may be used.

After the desired meter readings have been taken, the valves are removed and the holes in the sheath are permanently closed. It is desirable that this should be done with the cable under pressure and with as little loss of gas as possible in order that additional defects may be located without draining and recharging the cable. The object of my invention is to provide a method of and apparatus for facilitating closure of the holes in the sheath with the cable under pressure and with a minimum disturbance of the gas pressure therein. My method of closing the holes and permanently sealing closure plugs will be clearly understood from the following description in connection with the accompanying drawings, in which—

Figure 1 is a side elevation, partly in section, of a portion of a cable showing a hole in the cable sealed according to my invention.

Figure 2 is a perspective view of a plugging tool for inserting a plug and expansion pin.

Figures 3 and 4 illustrate the manner of inserting a rubber plug into a hole in the sheath.

Figure 5 shows the tool withdrawn and the protruding portion of the plug cut off.

Figures 6 and 7 illustrate the manner of inserting an expanding pin into the central opening in the plug.

Figure 8 shows the tool removed and the protruding portion of the pin cut off.

Figure 9 illustrates the manner of temporarily clamping the sheet metal casing or bonding device over the plug while molten solder is flowed over the plug and adjacent portion of the sheath until the casing is completely filled and becomes an integral part of the sheath; and Figure 10 is a transverse view of the clamp shown in Fig. 9.

Before removing a valve from the cable sheath, a plug 2 of rubber or other suitable material having a central perforation is slid over the pin 3 of the plugging tool 5 and expansion pin 6 is inserted in the recess 7 in the opposite end of the tool, being frictionally held by a spring tongue 8. As the valve is removed, the plug is immediately inserted in the hole in the sheath in the manner indicated in Figs. 3 and 4. When the tool is withdrawn, the projecting outer end of the plug is cut off as indicated in Fig. 5 and the expansion pin 6 is immediately forced into the aperture in the plug as indicated in Figs. 6 and 7, thereby expanding the plug tightly against the wall of the hole and effectively sealing it gas-tight.

When the projecting end of the expansion pin has been cut off flush with the plug in the manner indicated in Fig. 8, a sheet metal hollow casing or bonding member 10 is positioned on the sheath over the plug and temporarily held by a clamping device as illustrated in Figs. 9 and 10. The loop of the flexible binding wire 12 is brought over the oppositely extending base portions 13 of the bonding member and secured over the downturned hook 14 of the clamping plate 15. A thumb screw 16 is threaded through a central nut 17 in the plate 15 and carries a swivelled yoke 18 which bears against the sheath.

When the clamp has been tightened, the case 18 which forms the housing of the bonding member is completely filled with molten solder by holding a stick of soft solder 19 against a hot soldering iron 20 as indicated in Fig. 9. Prior to the application of the bonding member the interior of the casing is tinned and the surface of the lead sheath surrounding the plug is scraped so that the molten solder will readily adhere. To ensure a perfect union of the metals, the soldering iron may be held for a short time against the mass of solder without injury to the lead sheath as the casing maintains the iron at a safe distance from the sheath. The rubber member 2 forms a deformable elastic medium interposed between the metal pin 6 and the lead sheath to compensate for the different coefficients of expansion of the two metals and thereby maintain a complete gas-tight seal when the heat is applied during the soldering operation. The surface of the plug is thus completely embedded in the solid body of the solder and the latter unites the bonding member into an integral union with the sheath.

I claim:—

1. A bonding device for sealing a hole in a lead cable sheath, comprising an elastic rubber plug filling said hole, a sheet metal housing enclosing said plug, and a mass of solder completely filling said housing and completely covering the plug opening and bonded to the cable sheath for a substantial distance therearound.

2. A bonding device for sealing a hole in a lead cable sheath, comprising an elastic rubber plug filling said hole, said plug having a rigid pin or core centrally disposed therein for expanding the rubber plug and a mass of metal completely covering the outer surface of said plug and pin and bonded to the adjacent portion of the sheath surrounding the plug.

3. A bonding device for sealing a hole in a lead cable sheath, comprising an elastic rubber plug filling said hole, said plug having a rigid pin or core centrally disposed therein for expanding the rubber plug, a sheet metal casing forming a housing about said plug and a mass of solder completely filling said housing and integrally uniting the housing and the enclosed surface of the sheath.

4. A bonding device for sealing a hole in a lead cable sheath, comprising a sealing member inserted in the hole, said member having a rigid pin forming a core and a compressible elastic medium surrounding said core to compensate for the difference in temperature coefficients between said core and the sheath, and a mass of solder completely covering the outer surface of said sealing member and bonded to the cable for a substantial distance therearound.

ADOLPH Z. MAMPLE.